Aug. 17, 1954

R. G. MILLS

RANDOM PULSE GENERATOR 2,686,876

Filed Sept. 5, 1945

2 Sheets-Sheet 1

Inventor
ROBERT G. MILLS

By Ralph L. Chappell

Attorney

Aug. 17, 1954

R. G. MILLS 2,686,876

RANDOM PULSE GENERATOR

Filed Sept. 5, 1945

2 Sheets-Sheet 2

Inventor
ROBERT G. MILLS

By Ralph L Chappell
Attorney

Patented Aug. 17, 1954

2,686,876

UNITED STATES PATENT OFFICE 2,686,876

RANDOM PULSE GENERATOR

Robert G. Mills, United States Navy

Application September 5, 1945, Serial No. 614,582

6 Claims. (Cl. 250—36)

(Granted under Title 35, U. S. Code (1952), sec. 266)

This invention relates in general to electronic pulse generator circuits and in particular to electronic pulse generator circuits for producing aperiodic electrical impulses.

An object of this invention is to provide an electronic pulse generator in which the interval between successive pulses is subject to a form of random variation while the average pulse recurrence rate is made controllable within limits.

Another object of this invention is to provide an electronic pulse generator of the foregoing character from which pulses having substantially uniform waveshape and amplitude may be obtained.

Other objects and features of the present invention will become apparent upon a careful consideration of the following detailed description when taken together with the accompanying drawings.

As is known in the art, shot effect and ionization noise voltages are generated in the normal operation of a gaseous discharge tube. These noise voltages may be considered as comprising a comparatively broad spectrum of frequencies which have approximately equal amplitudes over a substantial frequency range. Addition of these frequencies yields a waveform comprising a series of impulses of varying amplitudes. The time intervals between successive impulses in excess of any specified amplitude do not follow any discernable pattern. The average interval between impulses in excess of a specified amplitude is, however, under the influence of the specified amplitude and can be controlled to a certain extent by adjustment thereof. Advantage is taken of the above phenomena in constructing an electronic pulse generator according to the teachings of the invention.

Figure 1:
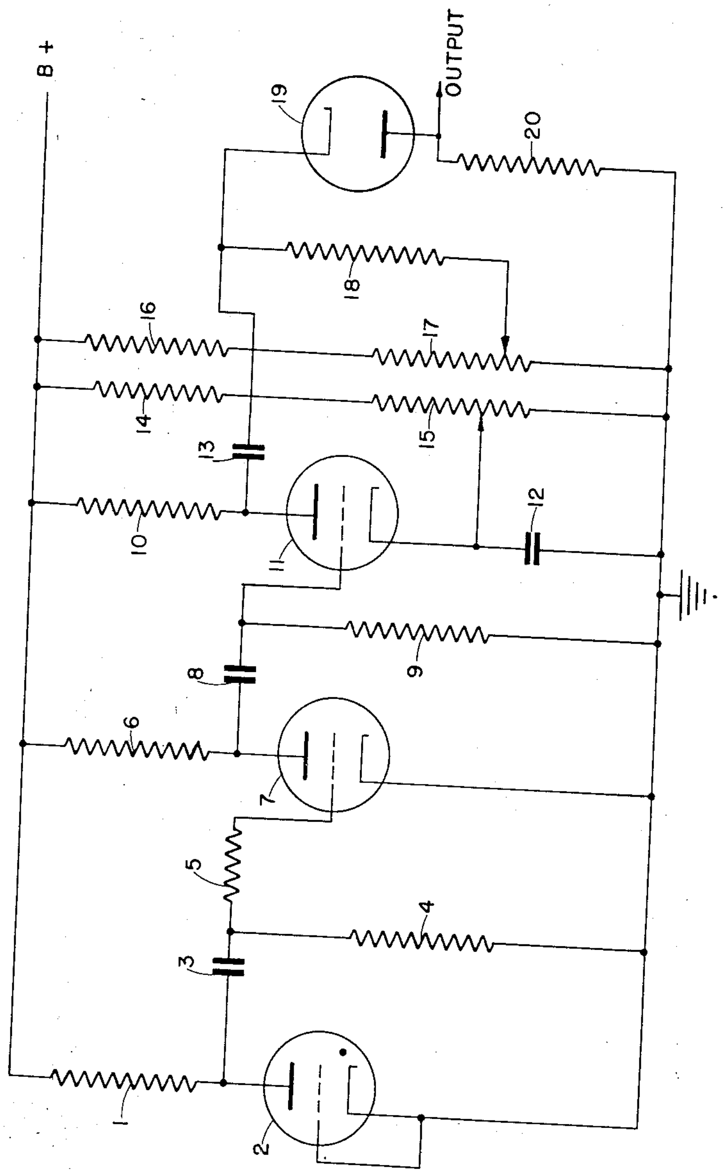
Fig. 1 is a schematic diagram of one embodiment of this invention.

In generating voltage pulses in accordance with the embodiment shown in Fig. 1, voltage variations appearing at the plate of a gaseous discharge tube, tube 2, are amplified in the succeeding stage 7 and applied to the control grid of the overbiased amplifier tube 11. Tube 11, which is amplitude responsive in action, is rendered conducting only by impulses exceeding some potential corresponding to its bias. The output of the overbiased amplifier stage is subjected to further clipping action in a biased diode 19 from the plate of which the output is obtained.

In particular, the gaseous discharge tube 2 is a thyratron, the plate of which is connected to the positive side of the power supply through a suitable plate load resistor 1 and the control grid and cathode of which are connected directly to the negative side of the power supply. Accordingly, the thyratron is conducting continuously when the circuit is in operation. Shot effects and ionization in the tube produce random voltage variations across plate load resistor 1. These random voltage variations are coupled to the control grid of amplifier tube 7 through a coupling circuit comprising capacitor 3, resistor 4, and grid limiting resistor 5.

The amplifier stage comprising tube 7 is operated at a bias near zero so that the negative impulses in the output of tube 2 will have been subject to a maximum and substantially constant amplification, while positive output impulses are suppressed by grid clipping through the action of resistor 5 which is selected of such a magnitude to prevent the accumulation of a significant signal bias on capacitor 3. By virtue of resistor 5, the output of amplifier tube 7 consists of substantially unipolar positive random pulses of varying amplitudes and recurrence rates. This output, which is developed across plate resistor 6, is coupled to the control grid of overbiased amplifier tube 11 through a coupling circuit comprising capacitor 8 and resistor 9. The unipolar output of tube 7 has a smaller peak to peak range than an equivalent bipolar output would have, and the coupling circuit applies this signal to the control grid of tube 11 so that the average value of said signal is at zero potential. Consequently, the bias required on the cathode of tube 11 so that it will respond only to certain peak impulses is correspondingly lower than that which would be required in the absence of resistor 5.

The cathode of tube 11 is connected to the variable tap on potentiometer 15 and to the negative side of the power supply through capacitor 12. Resistors 14 and 15 in series are connected across the power supply; consequently, the potential of the cathode of tube 11 is determined by the position of the tap on potentiometer 15. This potential is selected to hold tube 11 cut off in the absence of a signal exceeding some corresponding amplitude. Accordingly, only voltage impulses in excess of such amplitude will render the tube conducting, and the greater the cathode bias applied, the lower the average recurrence rate of such impulses will be.

When tube 11 is rendered conducting, an inverted, negative, and amplified representation of the excess portion of the impulses will be developed across load resistor 10. These negative impulses are applied to the cathode of diode 19 through blocking capacitor 13.

The cathode of diode 19 is maintained at a controllable positive potential by connection, through isolating resistor 18, to the variable tap on resistor 17 which is connected in series with resistor 16 across the power supply. The plate of diode 19 is connected to ground through load resistor 20 to provide a low impedance output. Diode 19 will conduct only when the amplitude of the negative pulses in the output of tube 11 exceeds the bias maintained on the cathode of the diode by adjustment of potentiometer 17 which provides further control of the average recurrence rate of the output signal.

The clipping or limiting action in the several stages is such that extremely well defined pulses are available at the circuit output. Variation of the cathode bias on tube 11 permits varying the pulse rate from approximately two pulses per second to over one hundred pulses per second, with the cathode potential of tube 19 maintained at a suitable value.

The embodiment just described functions to produce an output signal which is random both in occurrence and wave-shape. In some applications it may be desired to provide a circuit for producing signals of random occurrence but uniform waveshape. Such a circuit is disclosed in Fig. 2 to which reference is now had.

Figure 2:
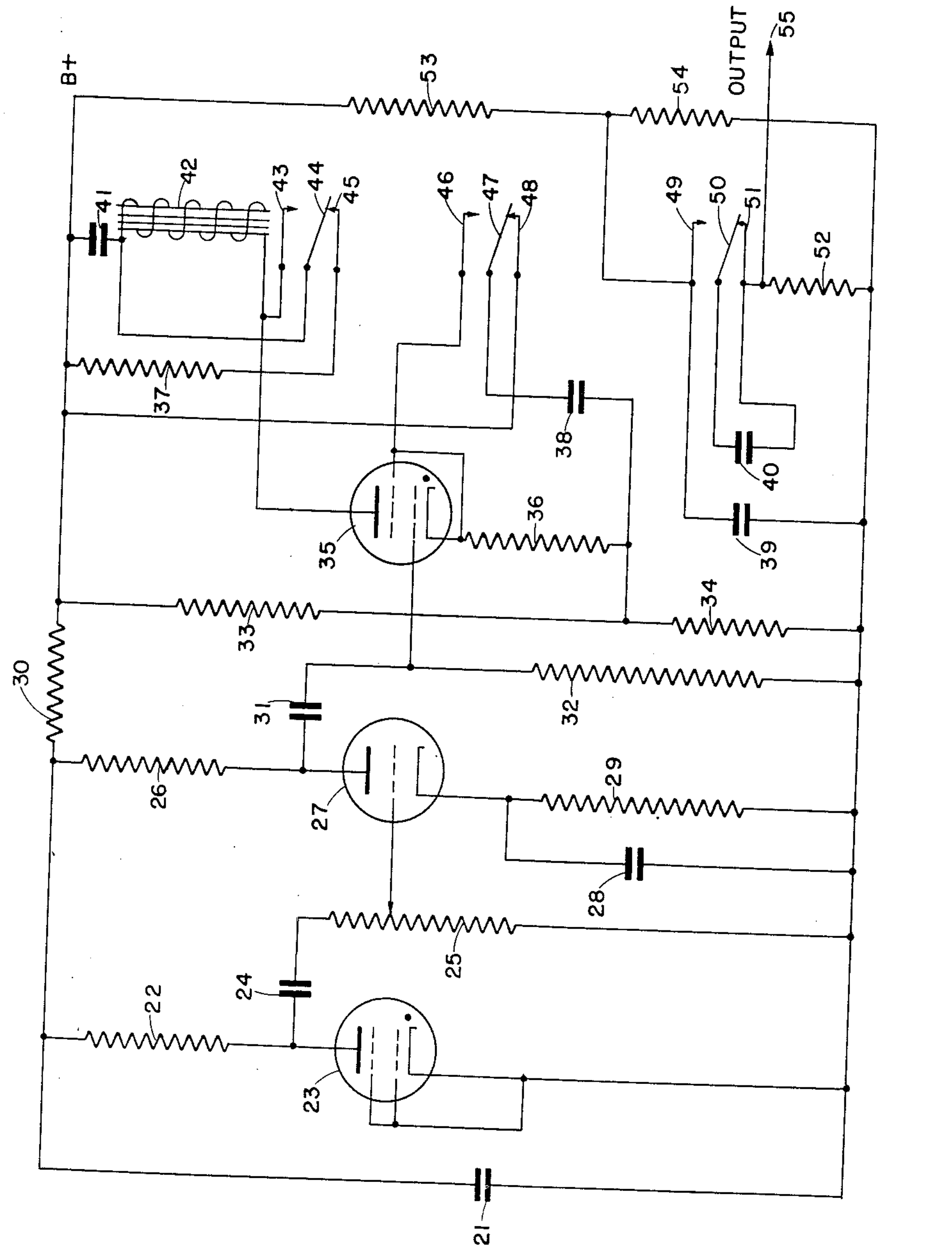
Fig. 2 is a schematic diagram of a second embodiment of this invention which utilizes a mechanical relay for the generation of output pulses.

In Fig. 2, voltage variations appearing at the plate of a first gaseous discharge tube 23 are amplified and applied to a second gaseous discharge tube 35. The latter, which is amplitude responsive in action, is biased so that it will fire only when the amplified signal from the first gaseous discharge tube exceeds a predetermined amplitude. When the second gaseous discharge tube fires, it activates a suitable auxiliary circuit which produces a voltage pulse of the desired amplitude and wave shape.

In particular the first gaseous discharge tube 23 is represented as a shield grid type thyratron with its plate connected through a suitable load resistor 22 to a source of positive supply and its two grids and cathode connected to a corresponding negative source of supply whereby the tube is maintained in a fully conducting state during the operation of the generator. Random voltage variations resulting from ionization and shot effects in tube 23 appear across the load resistance 22 and are coupled thru capacitor 24 and potentiometer 25 to the grid of a hard tube amplifier 27. The latter contains a self-biasing circuit comprising capacitor 28 and resistor 29 connected in its cathode circuit.

Capacitor 21 and resistor 30 stabilize the voltage applied to the first two stages.

The amplitude of the random voltage variations appearing across the plate load resistor 26 of tube 27 and consequently the amplitude of the signal applied to the control grid of the second gaseous discharge tube 35 by way of capacitor 31 and resistance 32 depends upon the setting of the variable tap on potentiometer 25. This amplitude adjustment by potentiometer 25, as hereinafter described, controls the average pulse recurrence rate at the output terminal 55.

Gaseous discharge tube 35 is another thyratron the cathode of which is maintained at a positive potential by a voltage divider comprising resistors 33 and 34; consequently, the tube can be fired only when the applied impulses equal or exceed a corresponding critical amplitude. When the amplitude level of the random voltage is increased by adjustment of potentiometer 25, impulses exceeding any specified amplitude will recur with greater average frequency, and accordingly the intervals between the times in which the tube has enabling grid bias will be of shorter average duration.

Relay 42 is a double throw relay with three sets of contacts; one set of these contacts applies the plate voltage to thyratron 35; the second set of these contacts serves to deionize tube 35 at suitable time; and the third set of these contacts is used in the generation of the output pulses. The coil of relay 42 is in the plate circuit of thyratron 35; consequently, the relay is energized when the tube is fired.

When the relay is deenergized, the plate of thyratron 35 is connected to the positive side of the power supply through the relay coil, relay contacts 44 and 45, and resistor 37. When the relay is energized by the firing of thyratron 35, contacts 44 and 45 open, breaking the connection between the relay coil and the thyratron. Contacts 43 and 44 close, shorting the relay coil.

Sudden interruption of the current flow in the relay coil would cause undesirable arcing at the relay contacts. To reduce such arcing, capacitor 41 is inserted to bypass the relay contacts 44 and 45 and thus to provide a transient path for continued current flow. However, if capacitor 41 is made sufficiently large to effectively eliminate arcing, it permits current to flow through the thyratron for a period of time sufficiently long to permit contact 44 to short out the relay coil and return to 45 before the tube has deionized, in which event the cycle repeats itself and the relay vibrates out of control. Therefore, it is necessary to provide means for deionizing the tube when the relay operates, and it is the function of the circuits associated with relay contacts 46, 47, and 48 to accomplish this purpose. When the relay is deenergized, capacitor 38 is charged through contacts 47 and 48. When the relay is energized, this capacitor discharges through contacts 46 and 47 and resistor 36, momentarily driving the cathode potential of thyratron 35 above that of the anode and deionizing the tube.

The output pulses are formed in the circuits associated with relay contacts 49, 50 and 51. These circuits are connected with the circuits utilizing the noise voltage only through the power supply so that the output is effectively protected from interfering voltages. In the deenergized condition of the relay, relay contact 51 and thus output terminal 55 are at the same potential as the negative side of the power supply while relay contact 49 is at a potential determined by the voltage divider comprising resistors 53 and 54. When the relay is momentarily energized, capacitor 40 charges toward the latter potential through contacts 49 and 50 and resistor 52. The output pulses are the voltage impulses thus obtained across resistor 52. Capacitor 39 acts as a filter condenser on the voltage divider.

The amplitude of the output pulses can be determined by the selection of resistors 53 and 54. The average recurrence rate of the pulses is controllable within limits by adjustment of the gain control potentiometer 25. In this embodiment, upper limits to the recurrence rate are imposed by the mechanical limitations of the relay; lower limits may be assumed to be imposed by instability of the noise voltage amplitude level. The use of an electrically isolated relay actuated circuit for the output permits the generation of pulses which have a constant amplitude and which are free of interference from the voltages used in their timing.

Although I have shown and described certain limited and specific embodiments of the invention it is to be understood that I am fully aware of the many modifications possible thereof. Therefore this invention is not to be limited except insofar as is necessitated by the prior art and the spirit of the appended claims.

The invention described herein may be manufactured and used by or for the Government of the United States of America for Government purposes without the payment of any royalty thereon or therefor.

What is claimed is:

1. A random signal generator comprising, a first gaseous discharge tube so connected as to be in a state of conduction, a second gaseous discharge tube so connected as to be normally in a state of non-conduction, means coupling said first tube to said second tube to render said second tube conducting in response to output signals from said first named tube in excess of a selected amplitude, and pulse generating means connected to said second named tube for producing uniform output pulses in response to conduction by said second tube.

2. A random pulse generator comprising, a first gaseous discharge tube connected so as to be normally conducting, a second gaseous discharge tube connected so as to be normally non-conducting, said second gaseous discharge tube being so associated with said first gaseous discharge tube that said second gaseous discharge tube is rendered capable of conducting during voltage impulses from said first gaseous discharge tube which exceed a selected amplitude, a relay having a plurality of contacts associated therewith, the coil of said relay being in series with said second gaseous discharge tube, one set of contacts of said relay being connected so as to deenergize said relay after said relay is energized, a source of voltage, a second set of contacts of said relay being arranged so as to connect said voltage to the output terminals when said relay is energized, said selected voltage being from a source unaffected by the other circuits of this random pulse generator.

3. A pulse generator comprising, a gaseous discharge tube, a source of voltage across which said tube is connected, a relay having a plurality of contacts associated therewith, the relay coil being serially connected in the path of current flow for said tube through said contacts to disconnect said tube from across said source of voltage during the interval said relay is energized, a pair of output terminals connected to said source through a second set of contacts of said relay to apply a portion of the voltage of said source thereacross during the interval in which said relay is energized.

4. In a pulse generator, means of deenergizing a gaseous discharge tube comprising a resistance in the cathode circuit of said gaseous discharge tube, a relay, and a capacitor, said capacitor being connected across a source of voltage when said relay is in one position and said capacitor being connected in shunt with said resistance when said relay is in the other position.

5. A random signal generator comprising, a first gaseous discharge tube so connected as to be in a state of conduction, a second gaseous discharge tube so connected as to be normally in a state of non-conduction, a variable gain amplifier coupling said first tube to said second tube to render said second tube conducting in response to output signals from said first tube in excess of a selected amplitude determined by the gain of said amplifier, and pulse generating means connected to said second tube for producing uniform output pulses in response to conduction by said second tube.

6. A pulse generator comprising, a gaseous discharge tube, a source of voltage across which said tube is connected, a relay having a plurality of contacts associated therewith, the relay coil being serially connected in the path of current flow for said tube through said contacts to disconnect said tube from across said source of voltage during the interval said relay is energized, a pair of output terminals connected to said source through a second set of contacts of said relay to apply a portion of the voltage of said source thereacross during the interval in which said relay is energized, a third set of relay contacts for deionizing said tube, a resistor connected in the circuit of one electrode of said tube, a capacitor connected to said third set of relay contacts to be positioned across said source of voltage during the one condition of said relay and across said resistor during the other condition of said relay.

References Cited in the file of this patent

UNITED STATES PATENTS

| Number | Name | Date |
|---|---|---|
| 1,908,191 | Schriever | May 9, 1933 |
| 2,092,861 | Swart | Sept. 14, 1937 |
| 2,121,142 | Dudley | June 21, 1938 |
| 2,153,202 | Nichols | Apr. 4, 1939 |
| 2,183,248 | Riesz | Dec. 12, 1939 |
| 2,194,298 | Dudley | Mar. 19, 1940 |
| 2,340,967 | Langer | Feb. 8, 1944 |
| 2,396,898 | Storm | Mar. 19, 1946 |
| 2,398,701 | Firestone | Apr. 16, 1946 |
| 2,408,230 | Shoupp | Sept. 24, 1946 |
| 2,409,583 | Perkins | Oct. 15, 1946 |
| 2,416,307 | Grieg | Feb. 25, 1947 |
| 2,458,283 | McCreary | Jan. 4, 1949 |
| 2,481,014 | Herzog | Sept. 6, 1949 |
| 2,486,106 | Brown | Oct. 25, 1949 |
| 2,505,594 | Wallace | Apr. 25, 1950 |